Aug. 14, 1951  M. VERON  2,564,316
APPARATUS FOR EXTRACTION OF DUST
FROM GASES BY FILTRATION
Filed Aug. 4, 1947  2 Sheets-Sheet 1

INVENTOR
Marcel Veron
BY
J. P. Moran
ATTORNEY

Aug. 14, 1951 M. VERON 2,564,316
APPARATUS FOR EXTRACTION OF DUST
FROM GASES BY FILTRATION
Filed Aug. 4, 1947 2 Sheets—Sheet 2

INVENTOR
Marcel Veron
BY
ATTORNEY

Patented Aug. 14, 1951

2,564,316

UNITED STATES PATENT OFFICE 2,564,316

APPARATUS FOR EXTRACTION OF DUST FROM GASES BY FILTRATION

Marcel Véron, Neuilly-sur-Seine, France, assignor to The Babcock & Wilcox Company, Rockleigh, N. J., a corporation of New Jersey Application August 4, 1947, Serial No. 765,879
In France July 3, 1941

Section 1, Public Law 690, August 8, 1946
Patent expires July 3, 1961

10 Claims. (Cl. 183—46)

The present invention relates to a dust extracting apparatus for gas and more particularly to a filter for removing the entrained dust in the gases resulting from the combustion of pulverized coal. The present invention is particularly applicable to the filtering of high pressure and high temperature motive fluids as used to supply a gas turbine, such as disclosed in my co-pending application Serial No. 765,878, filed August 4, 1947.

This apparatus has been developed for the purpose of purifying gases produced by the combustion, under pressure and at a high temperature, of pulverized coal and intended to feed a gas turbine. The gaseous products of combustion are cleaned by filtration in layers of a filtering medium, such as sand, wherein the cleanliness of the gas may be accomplished to any desired and previously determined extent. The clean gases are thus suitable as a motive fluid for the operation of a gas turbine. Advantageously such an apparatus lends itself to the treatment of other gases presenting different and variable dust loading and temperature characteristics. Also, depending upon the nature of the gases treated, any pulverulent or granular material capable of withstanding high temperature may be suitable as a filtering medium in the filter beds.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described an embodiment of my invention.

Figure 1:
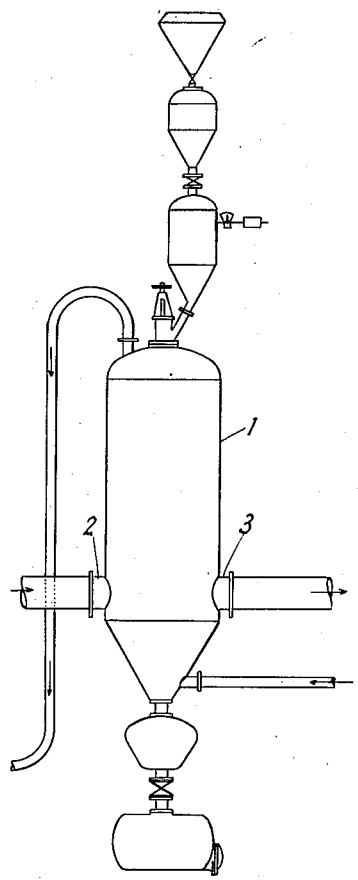
Fig. 1 is an assembly of the apparatus constructed in accordance with the present invention.
Figure 2:
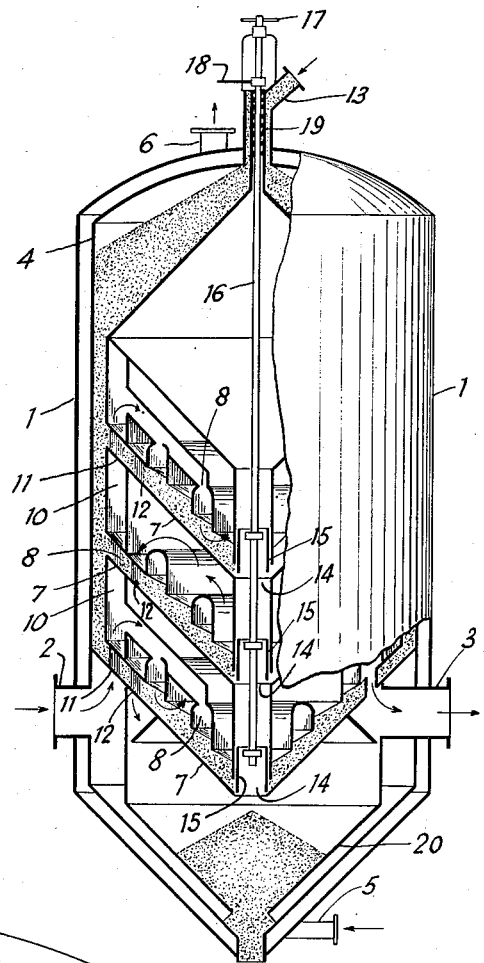
Fig. 2 represents a vertical section of the dust extractor.

As shown in Figs. 1 and 2 the dust extractor consists of a cylindrical casing or body 1 closed at its upper end by a domed cap, and at its lower end by a conical bottom. A flanged inlet 2 is arranged for the entrance of the gases, with their entrained dust, into the dust extractor. The gases may be generated in a separate combustion chamber for pulverized coal such as disclosed in my co-pending application. The purified gases leaving the dust extractor pass through the duct 3 towards the point of use, such as, for example, a gas turbine (not shown).

The body 1 contains an internal concentric lining 4 which is intended to protect the body 1 from the elevated temperature of the gases passing therethrough. The annular space between the lining 4 and the body 1 is constantly swept by a current of compressed air which enters an inlet 5 and leaves at outlet 6. Thus the lining 4 forms an enclosure for the dust filtering treatment of the gases while a cool outer body 1 sustains the pressure.

Figure 3:
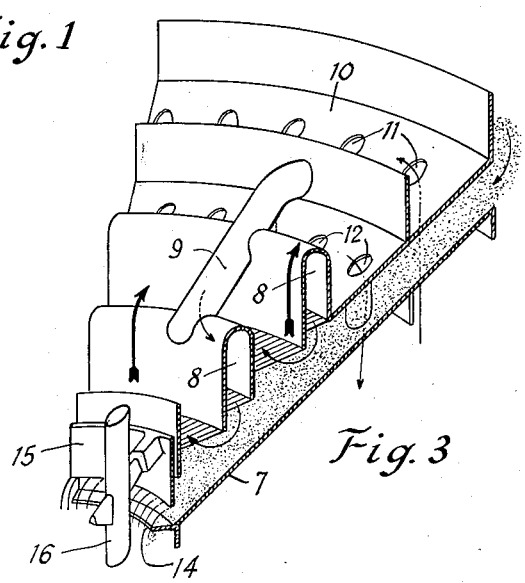
Fig. 3 is a vertical section, on a larger scale, of an element of the dust extractor.

Within the dust extractor are disposed filtering elements arranged in tiers. This construction is shown in Figs. 2 and 3 and it will be understood that the number of tiers varies according to the volume of gases to be purified. Each of the tiers is formed by a conical tray 7 supporting a layer of filtering medium such as sand, and spaced above each tray are circular channels 8 of inverted trough shape whose lower edges let the sand assume a position according to its natural inclination. Successive steps are thus formed between the different channels of the same tray for the passage of dust ladened gases through the filtering medium.

The circular channels 8 are interconnected radially by tubes 9 which bring them into communication with a vertically arranged series of annular peripheral chambers 10. The lower peripheral chamber 10 communicates with the superjacent chamber 10 through vertical tubes 11 for the admission of the dust laden gases while analogous tubes 11 bring all of the superimposed annular chambers into communication so that the dust laden gases may pass to each of the trays. A series of inner chambers for cleaned gases are positioned adjacent to and separated from the chambers 10 and between the trays 7. These inner chambers are also interconnected by a series of vertical tubes 12, so as to permit the circulation of purified gases which finally flow out through the duct 3.

The circulation of the high temperature gas is illustrated by the arrows shown in Figs. 2 and 3. The dust laden gases admitted at the inlet 2 penetrate each tier in the annular chambers 10 in parallel and traverse the spaced layers of sand. The dust entrained with the gases is deposited in the sand, with the gas passing into the inner chambers and thence successively through the inner chambers by means of the connecting tubes 12, to be exhausted through the outlet connection 3.

The clean sand is admitted through a spout connection 13 to the upper part of the dust extractor where it passes first into a reserve compartment and thence into the annular space between the lining 4 and the outer wall of the annular chambers 10 to feed different trays 7, over which it spreads. The trays have been provided with centrally located circular openings 14 which are normally closed by the movable slide valves 15. With the valves 15 closed and an adequate supply of clean sand, layers of sand on the trays will assume a stepped position, such as shown in Fig. 2. The individual slide valves are selectively movable in a vertical direction by means of a rod 16 which can be manipulated with the aid of a wheel 17. Each one of the slide valves is independently actuated by means of a selector lever 18. This is accomplished by catches on the rod 16 which selectively engage corresponding notches on the slide valves 15. This arrangement is illustrated in Fig. 3. Thus, with the rotation of the rod 16 so that the catches thereon will engage a corresponding notch on an individual slide valve 15, that valve may be opened by lifting the rod 16. Opening a valve 15 will permit the sand on the corresponding tray to flow by gravity into the central tube of the apparatus in which the slide valves operate. A labyrinth joint 19 on the rod 16 prevents any communication between the cooling air and the gas under treatment in the apparatus.

When the sand is heavily laden with collected dust, which can be determined by an increase in the pressure drop of the gases as measured between the entrance 2 and the exit 3, a quantity of the sand is allowed to run out by operation of the slide valves 15. The slide valves are preferably operated individually so that the sand will be replaced tier by tier so as to avoid an unequal dust loading in the sand of one or more tiers. Such an unequal dust loading in the sand could happen if the slide valves were operated simultaneously to evacuate the sand from all of the trays at once. The dust laden sand falls through the central tube into the conical funnel 20 at the bottom of the dust extractor from which it can be removed by any appropriate means. A special arrangement of dust laden sand removal is hereinafter described.

The regulation of the maximum dimensions of the dust particles in the gases passing from the dust extractor can be obtained by selecting a suitable screened sizing of the sand utilized as a filter medium and by regulating the flow of the gases therethrough. In a similar manner the length of the flow path of the gases through the filter beds can likewise be selected by the proper dimensions of the apparatus. Sand is used as a filtering medium since it is readily available and can withstand elevated temperatures without damage, or without loss of filtering power with changes of operating temperature. In addition the cylindrical form of the apparatus lends itself to the use of high gas pressures. Hence the apparatus described is capable of filtering gases having widely varying characteristics.

Figures 4, 5:
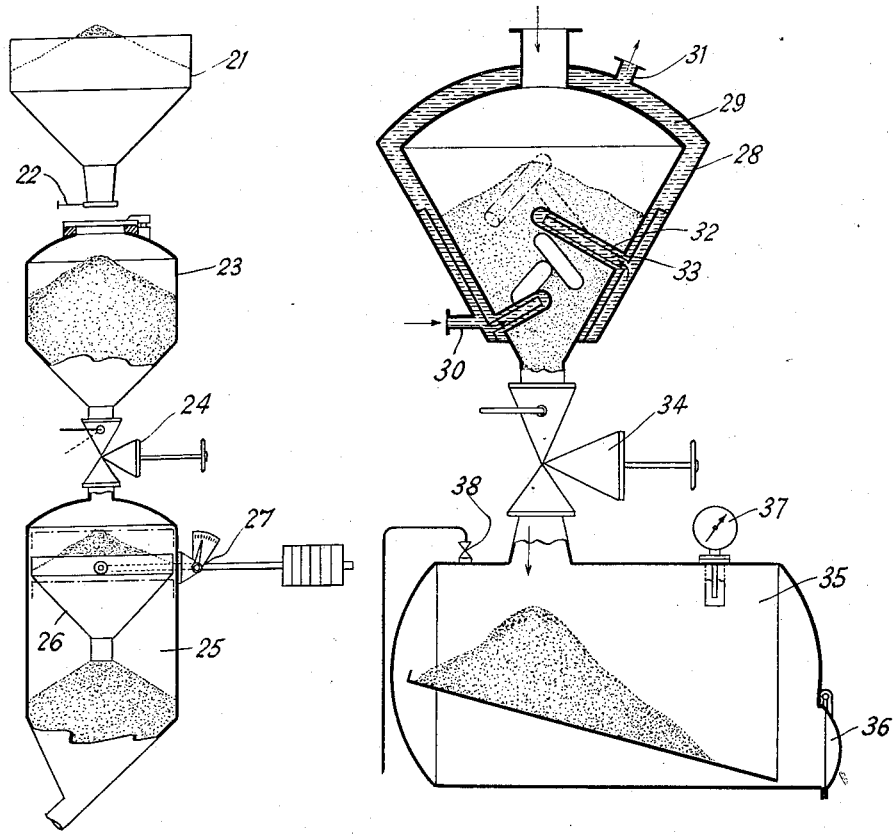
Fig. 4 shows a device adapted for feeding the dust extractor with filtering medium.
Fig. 5 shows a device adapted to evacuate the dirty filtering medium from the dust extractor.

The device for introducing clean sand through the spout 13 to the upper part of the dust extractor is shown in Figs. 1 and 4. The device includes a charging funnel 21 provided with a gate or flow regulator 22 and a bin 23 which may be operated under pressure and regulated by a pneumatic gate valve 24. A balance device is arranged to permit a predetermined quantity of sand to pass into the dust extractor when the level of clean sand therein becomes insufficient. The device includes a closed cylindrical vessel 25 having a funnel 26 which is mounted within the vessel 25 and is pivoted about a pin 27 mounted on the exterior surface of the device. The funnel 26 is counter-weighted and is provided with a needle mounted on the pin 27 and arranged to move across the face of a dial, by which the position of the funnel and the amount of clean sand therein may be determined. The funnel will move within the device depending upon the volume of sand within the dust extractor.

The dust laden sand is removed from the filter beds of the dust extractor by means of an apparatus shown in Fig. 5. This apparatus includes a cooler 28 connected directly with the conical hopper 20 forming the bottom of the dust extractor and into which the dust laden sand discharges. The sand entering the cooler 28 will be at an elevated temperature resulting from contact from the dust laden gases. This sand is cooled within the cooler 28 by a circulation of water in the envelope 29 of the cooler. The water enters the envelope at an inlet 30 and leaves through an outlet 31. The apparatus is constructed to prevent contact between the water and the sand. The cooling operation may last a suitable period of time by reason of the low heat conduction of the sand. However, accelerated cooling is accomplished by means of tubes 32 which are arranged to project into the sand mass and in which cooled water is circulated through the internal tubes 33.

When the sand is cooled it is evacuated from the cooler 28 with the aid of a pneumatic gate valve 34 and is discharged into a flask 35. The flask is designed to withstand the pressure of the gases within the dust extractor. The flask is also provided with a pressure sealing gate 36, of known type, which may be opened to permit the removal of sand from the flask. The pressure between the funnel 20 and the flask 35 is equalized before the pneumatic gate valve 34 is opened. A pressure gauge 37 is mounted on flask 35 so that the pressure within the flask may be determined before the valve 34 is opened. A combined inlet and discharge valve 38, mounted on the flask 35, may be used to cause a lowering of the pressure in the flask to facilitate the fall of the dust laden sand in case it should be slightly agglomerated.

It will be observed that the described method of evacuating the dry sand may be replaced by the hydraulic arrangement described in my co-pending application. The extraction of the hot ashes in the combustion chamber described in said application may be substituted for the apparatus described herein since the functioning of either arrangement is substantially the same regardless of the type of granular ashes or sand to be evacuated. The removal of the sand in a dry state offers the advantage of avoiding any production of steam in the operation. Any steam produced might possibly be taken along by the gases prdouced in the combustion chamber or treated in the dust extractor and pass into the gas turbine.

The cooling air introduced into the annular space between the body 1 and the lining 4 at the inlet 5 and exhausted at the outlet 6 may originate from any convenient source. As disclosed in my co-pending application, a convenient source of cooling air is the compressed air utilized for combustion in generating the motive fluid. In such circumstances the combustion air is compressed by a compressor operated by the gas turbine with the high pressure air passing through the cooling space surrounding the gas filter. The air acquires heat in cooling the gas filter and thereafter is passed to the combustion chamber. The compressed air is effectively prevented from combining with the combustion gas filtered within the gas filter so that the motive fluid is not cooled by infiltration of air within the filter nor is the compressed air diluted by products of combustion.

In the operation of the described gas filter, the dust laden gas produced by the combustion of pulverized coal is effectively cleaned in its passage through the filtering beds. Ordinarily the sand constituting the filtering medium is of a fine sizing for effective dust removal. While fine sand sizing will increase the pressure drop of gas flow through the beds, as compared with a coarse sand filtering medium, the extended area of flow through the beds permits low gas velocities and an acceptable gas pressure drop. The multiple annular channels 8 are arranged for a parallel flow of gas into an extensive area of the sand filter beds, with the total area of gas flow many times that of the gas inlet.

The conical trays 7 are installed with an angle of slope greater than the angle of repose of the filtering medium so that the medium forms in steps adjacent the depending edges of the channels 8. As shown in Figs. 2 and 3, the spacing between the depending edges of all of the channels and the upper surface of the corresponding trays are substantially equal. Thus the depth of filtering medium adjacent each channel is substantially uniform throughout the gas filter and the gas flow resistance will likewise be substantially equal. As a result the gas flow will also be substantially uniformly distributed to each portion of the filtering beds.

With an increase in gas flow resistance through the filter, as caused by an accumulation of ash particles or dust in the filter beds, the filtering medium can be replaced with clean medium by a gravity flow of the medium from the beds. The flow of filtering medium is easily regulated by means of the selective valves 15, and as the dirty medium is removed the clean medium immediately takes its place without any interruption in the filtering process. This simple replacement of filtering medium during use is of considerable advantage to a continuous filtering process and avoids the complication of by-passing gas flow around sections of a filter during periods of cleaning the filter beds.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. A gas filter comprising a casing having an inlet and an outlet for hot gas, a tray of inverted frusto-conical shape within said casing, a layer of granular filtering medium on said tray, the base angle of said frusto-conical tray being greater than the angle of repose of said granular filtering medium thereon, and means for causing the hot gases entering said casing to pass through said filtering medium to remove entrained dust therein including an inverted dust laden gas channel arranged with its depending edges spaced from said tray and submerged in said filtering medium the transverse spacing between said depending edges determining the flow path of hot gas through said filtering medium.

2. A gas filter comprising a casing having an inlet and an outlet for hot gas, a tray of inverted frusto-conical shape within said casing, a bed of dry filtering medium on said tray, the base angle of said tray being greater than the angle of repose of said dry filtering medium thereon, a plurality of annular channels coaxially arranged with their depending edges spaced above said tray and submerged in said filtering medium, said channels having substantially equal transverse dimensions, means connecting said gas inlet with said annular channels, and means for collecting said gas after passing through said bed of filtering medium and connecting with said gas outlet.

3. A gas filter comprising a casing having an inlet for hot dust laden gas and an outlet for hot clean gas, an inclined tray within said casing, a bed of granular filtering medium on said tray, the angle of tray inclination being greater than the angle of repose of said granular filtering medium thereon, a plurality of open bottom channels spaced across said tray and positioned with each of their depending edges projecting beneath the surface of said bed of granular filtering medium, the transverse spacing between said depending edges defining the flow paths of hot gas through said granular filtering medium, a hot dust laden gas distributing chamber, a tube connecting said chamber with said gas inlet, a plurality of tubes connecting said chamber with said open bottom channels, a clean gas collecting chamber arranged to receive the gas leaving said bed of granular filtering medium, and a tube connecting said clean gas chamber with said gas outlet.

4. A gas filter comprising a cylindrical casing having an inlet and an outlet for hot gas, an inverted frusto-conical tray within said casing, a bed of sand on said tray, the base angle of said tray being greater than the angle of repose of said sand thereon, a plurality of open bottom annular channels coaxially arranged in radially spaced relationship and having their depending edges equally spaced above said tray, the transverse spacing between said depending edges defining the flow paths of hot gas through said filtering sand, an annular plate arranged in parallel spaced relationship with said tray and having its inner circumferential edge affixed to the adjoining depending edge of one of said annular channels, an annular chamber defined in part by said annular plate, an annular partition arranged to divide said annular chamber into inner and outer annular chambers, tubular connecting means between one of said annular chambers and said hot gas inlet, a tubular passage connecting said entering gas chamber with said channels, said other annular chamber in communication with a closed space above said bed of sand to receive filtered gas, and at least one tubular means connecting said other annular chamber with said gas outlet.

5. A gas filter comprising an upright cylindrical casing having an inlet and an outlet for a hot gas, a plurality of inverted frusto-conical trays in vertically spaced relation within said casing, a bed of filtering sand on each of said trays, the base angle of each of said frusto-conical trays being greater than the angle of repose of said filtering sand, a plurality of open bottom annular channels spaced across each of said trays and positioned with their depending edges equally spaced from the respective trays and submerged in the filtering sand beds, each of said channels being substantially equal in cross-sectional shape and area, the transverse spacing between said channels being greater than the transverse dimension between the depending edges of each channel, means connecting each of said channels with said gas inlet for parallel flow of gas through said filtering sand, and means for collecting the hot gas leaving said sand beds for discharge to said hot gas outlet.

6. A gas filter comprising a casing having an inlet and an outlet for a hot gas, a series of inclined trays within said casing each arranged to support a layer of sand thereon, the tray angle of inclination being greater than the angle of repose of said sand, at least one channel of inverted trough section with its depending edges equally spaced above each of said trays and submerged in said sand, the transverse spacing between said depending edges determining the gas flow path through said sand layer, a chamber associated with each tray and arranged to receive hot gases from said gas inlet, tubes connecting said channels with said chambers for the parallel flow of gas through said layers of sand, and a series of interconnected chambers arranged to receive the gases after passing through said sand and to discharge the filtered gas to said outlet.

7. A gas filter comprising a cylindrical casing having an inlet and an outlet for a hot gas, a cylindrical liner within said casing and radially spaced therefrom to define a cooling fluid passageway therebetween, a plurality of vertically spaced inverted frusto-conical trays arranged in parallel relationship within said liner and casing, a bed of granular filtering medium on each of said trays, the base angle of each of said trays being greater than the angle of repose of said filtering medium, a plurality of open bottom annular channels spaced across each of said trays and positioned with their depending edges equally spaced above the respective trays and submerged in said beds, each of said channels being substantially equal in cross-sectional shape and area and spaced from an adjacent channel with the adjacent depending edges of the separate channels having a greater radial dimension than that between the depending edges of each individual channel, means for causing a flow of dust laden hot gas in parallel from said inlet to each of said channels, means for collecting the gas after passing through the filtering medium and delivering the filtered gas to said outlet, a filtering medium discharge pipe centrally located with respect to all of said trays, a valve in said discharge pipe adjacent each of said trays and selectively operable from the exterior of said casing, and a filtering medium reservoir in the upper portion of said casing in gravity flow relationship through an annular passageway to the upper periphery of each tray.

8. A gas filter comprising a cylindrical casing having an inlet and an outlet for a hot gas, a liner within said casing and radially spaced therefrom to define a cooling fluid passageway therebetween, a plurality of vertically spaced inverted frusto-conical trays arranged in parallel relationship within said liner, a bed of filtering sand on each of said trays, the base angle of each of said trays being greater than the angle of repose of said filtering sand, a plurality of open bottom annular channels spaced across each of said trays and positioned with their depending edges equally spaced above the respective trays and submerged in the sand bed thereon, each of said channels being substantially equal in cross-sectional shape and area and spaced from an adjacent channel with the adjacent depending edges of the separate channels having a greater radial dimension than that between the depending edges of each individual channel, means for causing a flow of dust laden hot gas in parallel from said inlet to each of said channels, and means for collecting the gas after passing through the sand and delivering the filtered gas to said outlet.

9. A gas filter comprising a cylindrical casing having an inlet and an outlet for a hot gas, an inverted frusto-conical tray arranged within said casing, a bed of filtering sand on said tray, the base angle of said tray being greater than the angle of repose of said filtering sand, a plurality of open bottom annular channels spaced across said tray and positioned with their depending edges equally spaced above the tray and submerged in the sand bed thereon, each of said channels being substantially equal in cross-sectional shape and area and spaced from an adjacent channel with the adjacent depending edges of the separate channels having a greater radial dimension than that between the depending edges of each individual channel, means for causing a flow of dust laden hot gas in parallel from said inlet to each of said channels, means for collecting the gas after passing through the sand and delivering the filtered gas to said outlet, and means for replacing the filtering sand in said bed with clean filtering sand while passing the hot gas through the filtering bed including a body of stored filtering sand positioned in the upper portion of said casing and in communication with said filter bed, a filtering sand discharge pipe arranged to receive the gravity flow of filtering sand from said bed and to direct its discharge from said casing, a valve in said discharge pipe operable from the exterior of said casing to control the gravity flow of filtering sand from said bed, an inclosed cooler arranged to receive the contaminated sand from said gas filter, and a flask arranged to periodically receive said cooled sand from said cooler under pressure equalizing conditions and for subsequent removal under atmospheric pressure conditions.

10. A gas filter comprising a cylindrical casing having an inlet and an outlet for a hot gas, means for cooling said casing, a plurality of vertically spaced inverted frusto-conical trays arranged in parallel relationship within said casing, a bed of filtering sand on each of said trays, the base angle of each of said trays being greater than the angle of repose of said filtering sand, a plurality of open bottom annular channels spaced across each of said trays and positioned with their depending edges equally spaced above the respective trays, each of said channels being substantially equal in cross-sectional shape and area and spaced from an adjacent channel with the adjacent depending edges of the separate channels having a greater radial dimension than that between the depending edges of each individual channel, means for causing a flow of dust laden hot gas in parallel from said inlet to each of said channels, means for collecting the gas after passing through the bed and delivering the filtered gas to said outlet, means for replacing said filtering sand with clean filtering sand while passing hot gas through said filtering bed including a filtering sand bin in communication with said bed of filtering sand and having a pressure sealing opening therein, and a balanced funnel within said bin arranged to externally indicate the quantity of filtering sand maintained within said gas filter.

MARCEL VÉRON.

REFERENCES CITED

The following references are of record in the file of this patent:

UNITED STATES PATENTS

| Number | Name | Date |
| --- | --- | --- |
| 964,719 | Wegescheidt | July 19, 1910 |
| 1,095,676 | Riggs | May 5, 1914 |
| 1,480,888 | Marshall | Jan. 15, 1924 |
| 1,731,223 | Brady | Oct. 8, 1929 |
| 1,765,087 | Mase | June 17, 1930 |
| 1,766,221 | Lynch | June 24, 1930 |
| 1,895,601 | Beuthner | Jan. 31, 1933 |
| 1,981,346 | Florez | Nov. 20, 1934 |

FOREIGN PATENTS

| Number | Country | Date |
| --- | --- | --- |
| 457,430 | Germany | Mar. 16, 1928 |
| 704,568 | France | Feb. 23, 1931 |